Patented Nov. 1, 1949

2,486,392

UNITED STATES PATENT OFFICE 2,486,392

ALKYLFURAN RESINS AND METHOD OF MAKING SAME

Andrew P. Dunlop, Riverside, and Paul R. Stout, Chicago, Ill., assignors to The Quaker Oats Company, a corporation of New Jersey No Drawing. Application October 10, 1945, Serial No. 621,592

6 Claims. (Cl. 260—67)

This invention relates to solid, fusible, soluble resins and to infusible, insoluble resins derived from alklyfurans, particularly methylfuran, and to methods of making the same.

In accordance with the present invention, fusible and soluble resins, solid at room temperature, are formed by heating an alkylfuran in the presence of an acidic material. In the following detailed description of the invention, reference will be made to the preparation of resins from methylfuran, but it is to be understood that higher homologs, ethylfuran, propylfuran, etc., may be similarly reacted to form resins.

In carrying out the present invention, methylfuran is heated in the presence of an acidic material, preferably under reflux conditions and at the reflux temperature of the mixture, for about ½–15 hours or longer, if desired. The reaction product so formed is a relatively viscous liquid which, on heating under atmospheric pressure at a temperature of about 160–175° C. to remove volatile components, yields a solid, fusible, soluble resin. The fusible resin is usually formed without splitting out water. Where, however, the heating of methylfuran with acidic materials is carried out for long intervals of time, some water splits out and an infusible, benzene-insoluble resin is formed along with the fusible resin. For example, on refluxing for 107 hours 1 mol of methylfuran and 0.04 mol of phosphoric acid, there was obtained a yield of 82% of a solid, fusible resin and 13% of an infusible, benzene-insoluble resin, based on the methylfuran used.

The yields of a solid, fusible resin obtainable by the process of this invention is, in part, dependent upon the particular acidic material used, the concentration thereof, the presence or absence of water and the time of the reaction. In general, higher yields of solid, fusible resin are obtained when the acidic material is an inorganic acid and is used in relatively high concentrations, and when the reaction is carried out in the absence of water or in the presence of only small amounts of water. In accordance with our invention, we have obtained yields of solid, fusible resin in excess of 85%, using hydrochloric acid gas in the reaction.

Any acidic material may be reacted with the methylfuran, but we prefer to use inorganic acids. The acid may be used in any desired form. Thus, in the case of hydrochloric acid, for example, it may be used in the form of concentrated (12N) acid, dilute acid, or as dry hydrogen chloride gas. Other inorganic acids such as phosphoric acid and sulfuric acid may also be used. Phosphoric acid is a particularly effective acid, for we have found that the yield of resin is considerably higher when this acid is used than when the same titratable amounts of hydrochloric acid or of other acidic materials are used.

Other acidic materials which may be used are organic acids such as formic, oxalic, trichloroacetic and p-toluenesulfonic acids, and acidic salts such as ferric chloride, stannic chloride and boron fluoride. The yields of solid, fusible resin obtainable with these acidic materials varies widely. Thus, as will be evident from the following examples, yields of 45% of solid, fusible resin, based on the methylfuran used, were obtained with a solution of stannic chloride in chloroform, and yields of in excess of 80%, based on the methylfuran used, were obtained with p-toluenesulfonic acid.

In the case of the acidic salts such as boron fluoride and stannic chloride, for example, it is preferred that these salts be used in the form of non-aqueous solutions. Thus, for example, a methyl alcohol solution of boron fluoride (7.5% $BF_3$), in an amount of 0.01 mol per mol of methylfuran, on being refluxed with methylfuran for one hour, yielded 20% of solid, fusible resin, based on the weight of the methylfuran.

In general, the quantity of acidic material which is used in the reaction may vary widely, from about 0.001 mol up to about 3.0 mol or even more of acidic material, per mol of methylfuran. The amount to be used depends on the activity of the acidic material, the presence or absence of water and the time of the reaction.

We have found that if the reaction between the methylfuran and the acidic material is effected in the presence of a small amount of a phenol such as phenol, resorcinol, cresol, xylenol, saligenin, etc., particularly phenol, the reaction rate is accelerated so that in a given short interval of heating improved yields of solid, fusible resin, based on the weight of the methylfuran used, are obtained. The amount of phenol with respect to the methylfuran which may be used may vary widely. We prefer, however, to use considerably less than equimolar proportions of phenol with respect to methylfuran, say from about 1 to about 30 mol per cent of the former with respect to the latter. For example, a 78% yield of solid, fusible resin (base on the original weight of methylfuran and phenol) was obtained by refluxing for 8 minutes 0.2 mol of methylfuran, 0.04 mol of phenol and 0.02 mol of hydrochloric acid. Using 0.004 mol of phenol, the same amounts of the other reactants and a reflux time of 45 minutes, a 75% solids yield was obtained. On the other hand, only a 52% yield of solid, fusible resin was obtained when the reaction was carried out with the same amounts of the reactants, except that the phenol was omitted.

It is manifest from the foregoing that increased yields of solid, fusible resin are obtained by carrying out the reaction in the presence of a phenol. In the case of simple phenols the phenol itself enters into the reaction, if at all, to but a limited extent. In the case of substituted phenols, particularly saligenin, the phenol appears to enter into the reaction to a greater extent.

The solid, fusible, soluble resins obtained in accordance with the present invention, either with or without phenol, are reactive with aldehydes to form insoluble, infusible products. The aldehydes which may be used are formaldehyde, compounds which engender formaldehyde such as paraformaldehyde, trioxymethylene, etc., acetaldehyde, benzaldehyde, furfural and the like. These insoluble, infusible reaction products are obtained by reacting the solid, fusible resin derived from methylfuran with an aldehyde in an acidic medium.

The following examples are illustrative of the methods of preparing the solid, soluble, fusible resins of the present invention. In these illustrative examples as well as in the succeeding group of examples illustrative of methods of preparing insoluble, infusible resins in accordance with the present invention, the term "parts" indicates parts by weight.

Example 1

16.4 parts of methylfuran was placed in a vessel fitted with a reflux condenser and hydrogen chloride gas (in proportions of 2.5 mols of the latter per mol of the former) was led through a calcium chloride drying tube and bubbled through the methylfuran for about ½ hour. During this time the material in the vessel heated spontaneously to boiling and became quite dark in color. About 1.7 parts of methylfuran evaporated during the process. The reaction mixture was then heated in an oven at 175° C., overnight, to remove volatiles, yielding 12.6 parts of solid, fusible resin. This corresponds to a yield of 86%, based on the unevaporated methylfuran.

Example 2

16.4 parts of methylfuran and about 2 parts of concentrated hydrochloric acid (12N) were heated under reflux conditions for two hours. The reaction mixture was heated in an oven at 175° C. for 16 hours to remove volatiles, yielding 12.3 parts of a solid, fusible resin. This corresponds to a yield of 75%, based on the methylfuran used.

Example 3

410 parts of methylfuran and about 50 parts of concentrated hydrochloric acid (12N) were heated under reflux conditions for 13 hours. The reaction mixture was heated in an oven at 175° C. for about 43 hours, yielding 204 parts of a solid, fusible resin. This corresponds to a yield of 50%, based on the methylfuran used.

Example 4

16.4 parts of methylfuran, 0.38 part of phenol and about 1.7 parts of concentrated hydrochloric acid (12N) were refluxed for 45 minutes and the reaction mixture was then heated in an oven at 175° C. for 29 hours, yielding 12.6 parts of a solid, fusible resin. This corresponds to a yield of 75%, based on the methylfuran and phenol used.

Example 5

16.4 parts of methylfuran and 1 part of an 85% phosphoric acid solution were refluxed for 25 minutes, at which time the bath temperature had risen to 150° C. The reaction mixture was heated in an oven at 175° C. for 16 hours, yielding 13.4 parts of a solid, fusible resin. This corresponds to an 82% yield, based on the methylfuran used.

Example 6

16.4 parts of methylfuran and ½ part of p-toluenesulfonic acid were refluxed for 1 hour. The reaction mixture was neutralized with 2.6 parts of 1 N NaOH and heated in an oven at 175° C., overnight, to remove volatiles, yielding 13.8 parts of a solid, fusible resin. This corresponds to an 81% yield, based on the methylfuran used and sodium p-toluenesulfonate.

Example 7

41 parts of methylfuran and ½ part of $FeCl_3.6H_2O$ were refluxed for 7½ hours and the reaction mixture was neutralized with 1 part of 6 N NaOH. The neutralized mixture was then heated in an oven at 175° C. for 16 hours to remove volatiles, yielding 15 parts of a solid, fusible resin. This corresponds to a 37% yield, based on the methylfuran used.

Example 8

16.4 parts of methylfuran and 1 part of a 15% solution of stannic chloride in chloroform were refluxed for 5 hours and the reaction mixture was then neutralized with about 2.4 parts of 1 N NaOH. The neutralized mixture was heated in an oven at 175° C. for 16 hours, yielding 7.3 parts of a solid, fusible resin. This corresponds to a yield of 45%, based on the methylfuran used.

The resins prepared in accordance with the foregoing examples are free flowing liquids at a temperature of about 150° C., but are dark colored, brittle solids, fusible somewhat below this temperature. The resins are soluble in acetone, benzene, dioxane, and furfural, but are insoluble in water and only slightly soluble in ethyl alcohol. They are compatible with other synthetic resins such as the phenol-furfural resins, phenol-formaldehyde resins and the like.

Tests on these resins show that they can be advanced to a fairly hard cure with phosphoric acid alone or with a mixture of paraformaldehyde and phosphoric acid. Sulfur or alcoholic potassium hydroxide give hard cures. Partial, soft cures are obtained with hexamethylenetetramine, with maleic anhydride and with ammonium thiocyanate.

The fusible, soluble resins of the present invention may be converted to a heat-convertible state or directly to the infusible, insoluble state by reaction with an aldehyde, in an acidic medium, as pointed out above. The quantities of the reactants may vary, say from about ½–2 or more mols of the aldehyde per mol of solid, fusible resin. The following examples are illustrative of this aspect of the present invention.

Example 9

100 parts of the solid resin of Example 3, 87 parts of furfural and about 6 parts of concentrated hydrochloric acid (12N) were reacted under reflux conditions for 20 minutes to form an infusible, solid resin.

*Example 10*

100 parts of the solid resin of Example 3, 17.7 parts of formaldehyde, 300 parts of dioxane and about 6 parts of concentrated hydrochloric acid (12N) were heated under reflux conditions for one hour to form a solid but slightly fusible resin. The catalyst was neutralized with aqueous NaOH and then the resin was placed on a stroke cure plate (temperature 150° C.). The resin melted on the plate and then converted rapidly to the infusible state.

The soluble fusible resins and the insoluble, infusible resins prepared in accordance with our invention may be used alone or together with other resinous bodies in the preparation of solutions for impregnating and laminating purposes, in the preparation of protective coatings and varnishes, for the formation of molding articles and for other uses which will be readily apparent to skilled workers in the art.

Our invention is not to be construed as limited to the specific conditions, proportions and details set forth in the foregoing illustrative examples except insofar as such limitations are specified in the appended claims.

We claim:

1. A resinous material resulting from the heating of a solid, fusible, soluble partially polymerized monoalkylfuran and an aldehyde in an acid medium.

2. A resinous material resulting from the heating of a solid, fusible, soluble partially polymerized monomethylfurane and an aldehyde in an acid medium.

3. An artificial resinous material resulting from the heating of a solid, fusible, soluble partially polymerized monomethylfurane and furfural in an acid medium.

4. An artificial resinous material resulting from the heating of a solid, fusible, soluble partially polymerized monomethylfurane and formaldehyde in an acid medium.

5. The process of preparing artificial resins comprising mixing a monoalkylfuran polymer in a solid, fusible, soluble resinous state with an aldehyde and heating the mixture in an acid medium at least until a reaction between said furan and said aldehyde is effected.

6. The process of preparing artificial resins comprising mixing a monomethylfuran polymer in a solid, fusible, soluble resinous state with an aldehyde and heating the mixture in an acid medium at least until a reaction between said furan and said aldehyde is effected.

ANDREW P. DUNLOP.
PAUL R. STOUT.

REFERENCES CITED

The following references are of record in the file of this patent:

UNITED STATES PATENTS

| Number | Name | Date |
| --- | --- | --- |
| 2,306,924 | Zerweck | Dec. 29, 1942 |
| 2,323,333 | Kauth | July 6, 1943 |
| 2,343,973 | Harvey | Mar. 14, 1944 |
| 2,383,790 | Harvey | Aug. 28, 1945 |
| 2,406,319 | Brooks | Aug. 27, 1946 |

OTHER REFERENCES

Boeseken Recueil des Travaux Chimiques des pays-bas, vol. 50, pages 1023–1034 (1931).

Michalek Chemical and Engineering News, vol. 22, pages 1559–1563, Sept. 25, 1944.